May 1, 1951  M. C. SUPITILOV  2,551,349
SLIDE FILM PROJECTOR WITH FILM ADVANCE CONTROLLED
BY A SOUND REPRODUCING SYSTEM
Filed March 11, 1946
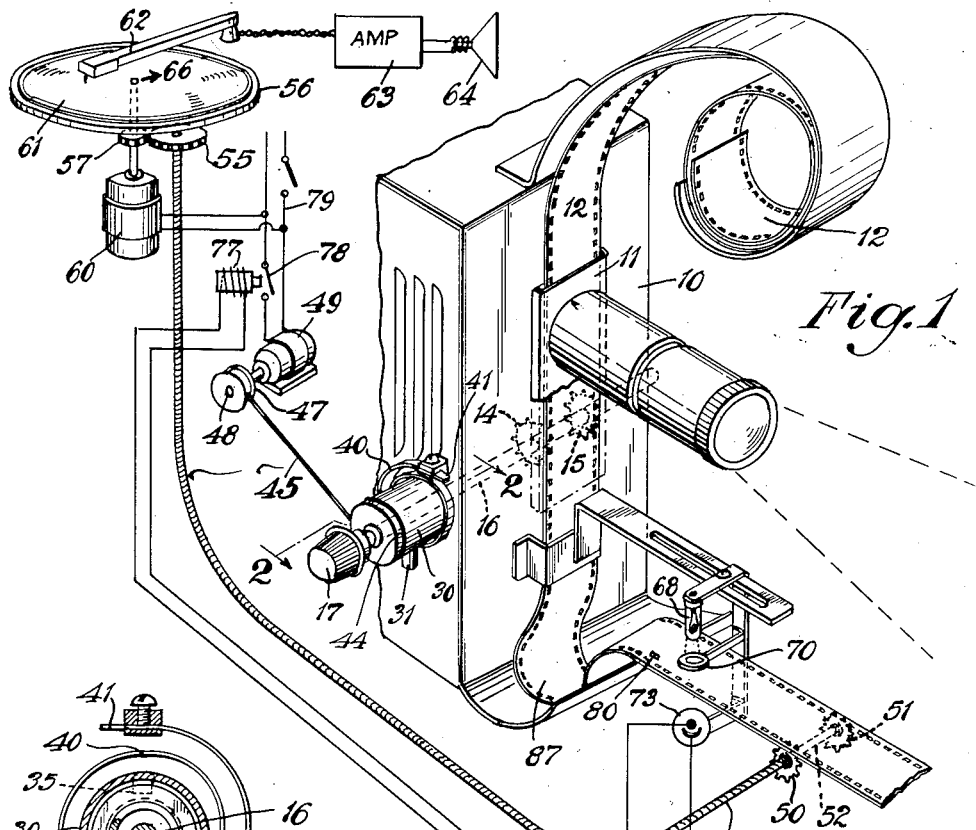
Fig.1
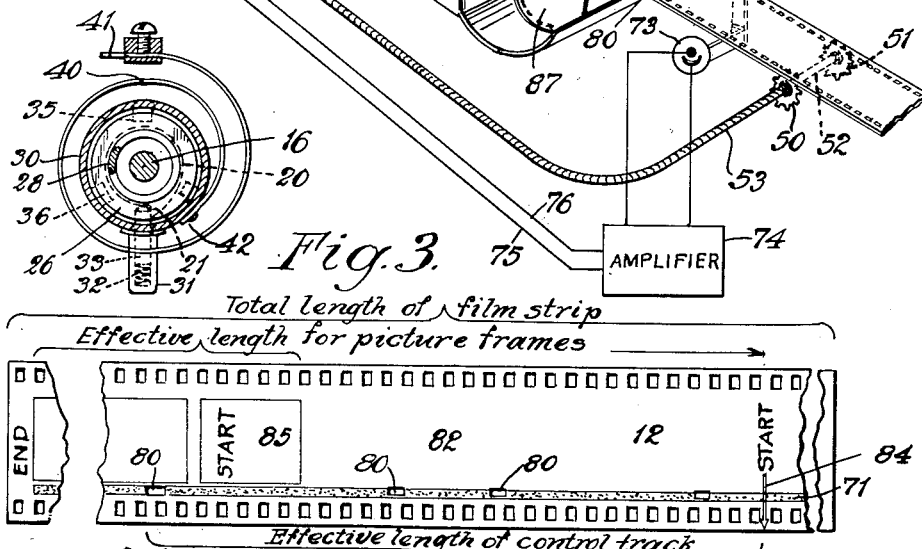
Fig.3.
Fig.4
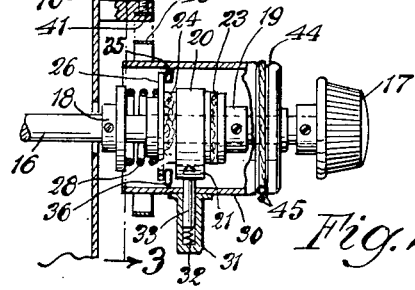
Fig.2
Inventor
Michael C. Supitilov
By Robert L. Kahn
Attorney.

Patented May 1, 1951

2,551,349

UNITED STATES PATENT OFFICE 2,551,349

SLIDE FILM PROJECTOR WITH FILM ADVANCE CONTROLLED BY A SOUND REPRODUCING SYSTEM

Michael C. Supitilov, Geneva, Ill., assignor to Operadio Manufacturing Co., St. Charles, Ill., a corporation of Illinois Application March 11, 1946, Serial No. 653,501

1 Claim. (Cl. 88—28)

This invention relates to an electrical apparatus and particularly to an apparatus for synchronizing picture projection and sound records. In connection with intermittent and irregular projection of film, it is desirable to provide some speech or musical accompaniment. Sound recordings on disc records or wire, as in telegraphones, are frequently used in connection with short lengths of film for use in sales promotion or service work. Inasmuch as the duration of projection of one film frame may differ from another film frame, it is difficult to synchronize the projection of a particular frame with a particular portion of a sound recording.

Numerous attempts have been made to synchronize a sound record and film where the film is projected at irregular intervals. Such attempts have relied upon various principles. Thus, certain signals, generally of a super-audible nature, have been provided on the sound record, which signals triggered a frame advancing means for projecting a new film frame. In other systems, various complicated mechanical means have been used.

Systems of the prior art have suffered from serious drawbacks. The systems have been complicated and expensive and practically impossible to use to any great extent. It is essential that the picture film be maintained in a condition where prints may be readily made. The same is true with regard to duplicating the sound record. It is necessary that a system be simple, easy to set up and take down, be substantially fool-proof and operate with a minimum of difficulty. The systems of the prior art have fallen far short of these objectives.

In accordance with the invention herein, there is provided a system which meets the above objectives to a remarkable degree. The system is simple and relatively inexpensive so that wide distribution and use becomes possible. The film to be projected may be standard film and, while altered, may be reproduced in altered form without substantial additional expense. The sound record itself may be made in any manner and may be any one of a number of well-known types. Conventional disc records or wire telegraphone records or separate film sound records may be utilized. Other kinds of records may be used.

In general, the invention contemplates providing a standard projector with means for advancing a picture frame in response to a control means. This control means cooperates with deformations on a control track on the film and is located at a distance from the projector gate along the path of film travel but in proximity to some means for moving film continuously. This continuously moved film part is hereinafter designated as a synchronized part of the film. Synchronized with the continuously moving part of the film is a sound record and moving means therefor forming part of the sound reproducing system and moving during sound reproduction. The projected part of the film which is at the projector gate and the synchronized part of the film are two separate parts of the film at any one instant of time. The same physical part of the film may be a sychronized part at one instant and may be a projected part at another instant.

The film carrying both picture frames and control track will have some definite length. Part of this length will be taken up by picture frames. A different and preferably over-lapping part of this length will be taken up by film deformations in the control track of the film. Each frame to be projected has a corresponding control track deformation. It follows, therefore, that adjacent control deformations along the control track will be separated by a distance corresponding to the time which the sound reproducer requires to dispose of the corresponding projected frame. Thus, the adjacent control deformations will be spaced in direct proportion to the projection time for the corresponding frame. The film, therefore, carries control deformations at one part of the film length for determining the projection time of a frame at another part of the film length.

The film has a starting deformation in the control track and a starting frame for projection while the sound record has some starting indication so that the system may begin operating in proper timed relation. In practice, the starting deformation may be different from the remaining control deformations and may even consist of the bare physical end of the film under certain conditions. Also under certain conditions, the starting indication on the sound record may be omitted as such and reliance had upon the fact that the sound record is started at its beginning. As an example, a disc record may be started from any angular position, providing the pick-up engages the outermost groove, without serious mis-timing. For precise work, however, it is desirable to provide for starting the record, control track and picture frames in accurate timed relation. Manual means are provided so that variations in timing may be made.

The control track deformations may be physical, photographic or molecular. Physical deformations may be in the form of apertures or notches, while photographic deformations may be light or dark spots in contrast to a dark or light control track. Molecular deformation may be provided by having a magnetizable control track and locally magnetizing the track.

Each time a deformed portion of the control track passes the control means, the projected frame is advanced. Due to the fact that the synchronized portion of the film travels in synchronism with the record while the projected portion of the film travels intermittently, there may be some slack in the film. The amount of slack will depend upon the number of frames projected and the irregularity in frame projection time as compared to record travel.

Any type of record may be used. In addition to a disc record or a magnetic record, it is possible to use a separate sound on film record. Since the control part of the film and sound record remain in synchronism, it is immaterial whether the record moves uniformly or at variable speeds. However, most reproducing systems operating with a sound record provide for uniform movement or rotation of the record.

Referring now to the drawings, Figure 1 shows a system embodying the invention, part thereof being in perspective and part being in diagrammatic form. Figure 2 is a sectional detail on line 2—2 of Figure 1. Figure 3 shows a sectional detail on line 3—3 of Figure 2. Figure 4 shows a plan view of a film strip for use with the system of Figure 1.

Referring to the drawing, 10 indicates part of a projector of any conventional construction. Projector 10 has gate 11 through which film 12 passes for projection. It is understood that the portion of film 12 at gate 11 is the part projected. Gate 11 may be of any desired construction and may be of the type that is hinged to permit ready insertion of film. The particular frame of film 12 which is at gate 11 for projection may be considered as a projected frame and the part of the film at gate 11 will, therefore, be considered as the projected part of the film.

Adjacent gate 11 is a suitable means for moving film 12 through the gate. This means comprises sprockets 14 and 15 mounted on shaft 16. Shaft 16 carries knob 17 at the end thereof to permit manual adjustment of the projected part of film 12. Shaft 16 has two collars 18 and 19 rigidly secured thereto and spaced from each other. Between these collars is a cam and clutch assembly. Thus, shaft 16 has cam 20 loosely mounted thereon. This cam may be shaped to provide drop 21, the rest of the cam surface providing a smooth curve. Cam 20 is disposed between friction discs 23 and 24 of felt, leather or rubber. Disc 24 is disposed between cam 20 and washer 26. Between washer 26 and collar 18 is coil spring 28. This coil spring presses washer 26 against friction disc 24, the pressure being sufficient to rotatively couple cam 20 to shaft 16.

Surrounding the cam and clutch assembly is drum 30 freely movable with respect to shaft 16, both rotatively and longitudinally. Drum 30 carries cylinder 31 extending outwardly therefrom. Cylinder 31 has spring 32 therein and movable pin 33, which projects through a suitable aperture in drum 30 to bear against cam 20. Drum 30 has ears 35 and 36 extending inwardly from the inside surface thereof and so disposed as to be normally adjacent washer 26. Drum 30 is arranged so that, upon longitudinal movement along shaft 16 toward projector 10, ears 35 and 36 will engage washer 26 and compress coil spring 28. Cam 20 will thereupon be released from shaft 16 and be freely movable.

As is evident in Figure 2, drum 30, ears 35 and 36 and knob 17 are so arranged with respect to each other that the drum normally remains in a position where pin 33 cooperates with cam 20. Drum 30 is rotatively biased to a predetermined position by coil spring 40 having one end 41 clamped to projector 10 and the other end 42 rigidly secured to drum 30. This spring also serves to maintain drum 30 normally centered for cooperation between pin 33 and cam 20.

Drum 30 is provided with suitable groove 44 in which thread 45 is disposed. Thread 45 has one end secured to the drum and, in the normal position of the drum, has somewhat more than one complete turn around the drum and extends to pulley 47 on motor shaft 48. Motor shaft 48 forms part of electric motor 49. Thread 45 has its other end secured to pulley 47. The size of drum 30 and length of thread coiled thereon are so related to sprockets 14 and 15 that a complete operating cycle of the drum mechanism will advance film 12 one frame. This, of course, occurs when motor 49 is energized and winds thread 45 around pulley 47. When that occurs, it is evident that motor 49 will stall when thread 45 is completely unwound from drum 30. It is understood that coil spring 40 has negligible effect on the extent of the unwinding operation from drum 30. Upon deenergization of motor 49, spring 40 will turn drum 30 back to its position, as shown in Figure 1, and at the same time will unwind the thread from pulley 47. Thus, a free wheel type of drive is provided. Any other kind may be provided.

As is clearly shown in Figures 2 and 3, cam 20 has its drop in such a direction with reference to pin 33 as to provide a driving connection between the cam and drum when the drum is turned in a clockwise direction as seen from knob 17 in Figure 1. Upon reverse movement of drum 30, the pin will merely slide around cam 20. It is clear that the angular extent of movement of drum 30 for each operating cycle will depend upon the number of drops 21 on cam 20 and the number of teeth in sprockets 14 and 15. It is, thus, possible to devise a drum drive so that less than a complete turn of drum 30 will suffice to advance film 12 a complete frame. In the system shown, however, anywhere between one and two turns of drum 30 may be relied upon for advancing the film by one frame.

Spaced from sprockets 14 and 15 along the path of film travel is a second means for moving film. This second means may comprise any suitable means, and, as shown here, consists of sprockets 50 and 51 on shaft 52. Shaft 52 is connected by flexible shaft 53 to gear 55 driven in timed relation to turntable 56. As shown in Figure 1, pinion 57 meshes with gear 55, pinion 57 being on the turntable shaft and driven by motor 60 of any suitable design. Inasmuch as motors with reducing gears for driving turntables are well known, a detailed description thereof will not be given. Resting on turntable 56 is conventional disc record 61 with which tone arm 62 cooperates. Tone arm 62 feeds its output to audio frequency amplifier 63 and thence to speaker 64. Disc 61 may be any disc record but is modified to the extent of having starting indication such as arrow 66 thereon to indicate a starting position. It is understood that the starting position is that position at which tone arm 62 is disposed and will be at the outermost groove of the disc record. Starting arrow 66 may conveniently be on the paper label usually carried at the record center.

Adjacent sprokets 50 and 51, which may be considered as the synchronized film driving means, is a control means. This control means is shown in Figure 1 as comprising a photoelectirc system. Thus, lamp 68 constitutes a source of light, which light is directed by lens system 70 to control track 71 of film 12. Control track 71 may be disposed anywhere along the length of film 12 and, as shown in Figure 4, is advantageously disposed between the picture frames and one series of sprocket holes. In practice, it is understood that light source 68 and lens 70 may be disposed in a housing on one side of film 12. As shown here, there is disposed on the other side of film 12 photoelectric cell 73 going to amplifier 74. Amplifier 74 has leads 75 and 76 going to electromagnet winding 77. Winding 77 cooperates with switch 78 controlling circuit 79 for supplying motor 49 with energy.

In the system shown in the drawings control track 71 has simple apertures 80 as the film deformations. Each aperture is large enough so that a ray of light may pass through the film from the light source to the photoelectric cell. It is understood that in an actual construction there will be provided a suitable gate for limiting the beam of light from the light source to the area of one of the film deformations, in this case aperture 80. Preferably, the remainder of control track 71 will be photographically exposed so that the background of the control track as developed will transmit little or no light.

The photoelectric cell and amplifier in this particular instances are so arranged that, when aperture 80 comes into the light path, switch 78 will be closed. At other times, switch 78 will be open. Inasmuch as photoelectric cells and amplifiers therefor are well known in industry, a detailed description thereof is deemed to be unnecessary.

Film 12 itself generally has a length of the order of about ten to twenty feet. As shown in Figure 4, film 12 will have film deformations 80 along part of the length and will have picture frames along a different part of the length. These two lengths preferably over-lap, the overlapping part being shown as part 82. It is evident from Figure 1 that the synchronized part of film 12 is further along the film path than gate 11 and may be considered as in advance thereof along the film path. It follows, therefore, that film 12 for this system will have the effective part of control track 71 displaced toward the beginning of the film as compared to the picture frames.

Thus, as shown in Figure 4, the effective beginning of film 12 may be indicated by starting arrow 84. Corresponding to starting arrow 84 is starting frame 85. During the initial set up of the machine, film 12 is disposed in the projector as shown with starting arrow 84 aligned with any suitable portion of the system such as the light beam from lens 70. Similarly fame 85 is aligned with gate 11 so that this frame is initially projected. The word "start" on frame 85 may be printed so that focusing of the projector may be accomplished. At the same time, disc record 61 is disposed so that tone arm 62 is at the outermost groove opposite starting arrow 66. Thereupon, the system is started by energizing motor 60, light source 68 and the photoelectirc system.

In operation, as disc 61 turns, synchronized part of film 12 at sprokets 50 and 51 will move in synchronism therewith. The ratio of travel between the film and disc may be adjusted to suit operating conditions. Thus, the linear distance traveled by the stylus of tone arm 62 throughout the entire extent of record 61 may be compared to the linear distance along the entire effective length of film 12. Thereafter, a simple proportion will determine the relative rate of feed of record and film.

As the synchronized portion of the film progresses past the control system consisting of light source and photoelectric cell, each aperture 80 will be effective to advance the projected part of the film one frame at gate 11. Each time that aperture 80 permits light to pass through to the cell, switch 78 will be closed and motor 49 will wind up thread 45. Thus, drum 30 will be turned a predetermined amount to turn shaft 16 for advancing the film one frame. When aperture 80 in the control track passes beyond the control means, switch 78 will be opened and the spring bias on drum 30 will operate to return the drum freely, without movement of shaft 16, back to its normal starting position.

In the event that a manual adjustment of the exposed part of the film is required, a simple movement of drum 30 along shaft 16 toward projector 10 will free cam 20 from shaft 16 and permit knob 17 to be turned independently of the power drive. Fixed end 41 of coil spring 40 may be adjusted to bring drum 30 to a desired normal position. It is also possible to advance film 12 a complete frame by merely turning knob 17. As many frames as desired may be advanced.

It will be evident that, as shown in Figure 1, film 12 will have a variable amount of slack 87 between the projected part of the film at gate 11 and the synchronized part of the film at sprockets 50 and 51. This slack will vary from a minimum, in which case the film will be disposed along the film path extending directly from gate 11. It is understood that the amount of slack will depend upon the sequence of picture projection and talking, and amount of overlap, if any, of film length for picture frames and film length for control track.

As shown in Figure 1, the synchronized portion of the film is disposed in advance of film gate 11 along the path of film travel. This, however, may be reversed.

What is claimed is:

In a projector for use with picture film, a film gate through which said film is threaded, means engaging said film for moving the same through said gate, said means including: a shaft, a knob on said shaft for manual rotation of said shaft, drive means including a first drum for turning said shaft in a film advancing direction and slipping over said shaft in reverse direction, a motor having a motor drum, a thread having one end anchored to said motor drum and the other end anchored to said first drum, means for biasing said drums to a predetermined normal position, said thread being normally wound around said first drum in a direction such that motor rotation will unwind thread from the first drum and wind it around the motor drum and turn the first drum a predetermined amount to advance the film, said drum bias means serving to return both drums and thread to predetermined normal starting position after said motor has been deenergized in combination with a sound reproducing system having a sound record movable during sound reproduction, means for continuously feeding film at a point in the film path spaced from said film gate, means for synchronizing the movement of said record with said continuous film feeding means and control means adjacent said continuous film feeding means cooperating with a control track on said film, said control means including as a part thereof means for intermittently energizing said motor.

MICHAEL C. SUPITILOV.

REFERENCES CITED

The following references are of record in the file of this patent:

UNITED STATES PATENTS

| Number | Name | Date |
|---|---|---|
| 761,846 | Messter | June 7, 1904 |
| 951,158 | Vogt | Mar. 8, 1910 |
| 1,358,085 | Lewis | Nov. 9, 1920 |
| 1,499,941 | Marette | July 1, 1924 |
| 1,591,081 | Curtis | July 6, 1936 |
| 1,826,786 | Hopkins | Oct. 13, 1931 |
| 1,998,889 | Wier | Apr. 23, 1935 |
| 2,038,976 | Wood et al. | Apr. 28, 1936 |
| 2,067,835 | Erwood | Jan. 12, 1937 |
| 2,141,037 | Franklin | Dec. 20, 1938 |
| 2,279,119 | Freimann | Apr. 7, 1942 |
| 2,281,943 | Loughner et al. | May 5, 1942 |
| 2,299,973 | Getten | Oct. 27, 1942 |
| 2,346,905 | Chedister | Apr. 18, 1944 |
| 2,425,704 | Nemeth | Aug. 12, 1947 |

FOREIGN PATENTS

| Number | Country | Date |
|---|---|---|
| 858,233 | France | May 6, 1940 |